(12) United States Patent
Brooks

(10) Patent No.: US 10,894,221 B2
(45) Date of Patent: Jan. 19, 2021

(54) METHOD AND APPARATUS FOR STAGE RIGGING

(71) Applicant: Wilson Brooks, Brentwood, MD (US)

(72) Inventor: Wilson Brooks, Brentwood, MD (US)

( * ) Notice: Subject to any disclaimer, the term of this patent is extended or adjusted under 35 U.S.C. 154(b) by 0 days.

(21) Appl. No.: 16/012,897

(22) Filed: Jun. 20, 2018

(65) Prior Publication Data

US 2018/0361267 A1 Dec. 20, 2018

Related U.S. Application Data

(60) Provisional application No. 62/522,178, filed on Jun. 20, 2017.

(51) Int. Cl.
| | |
|---|---|
| *B66D 3/06* | (2006.01) |
| *B66D 3/04* | (2006.01) |
| *A63J 1/02* | (2006.01) |
| *F16M 13/02* | (2006.01) |

(52) U.S. Cl.
CPC ............. *A63J 1/02* (2013.01); *A63J 1/028* (2013.01); *B66D 3/06* (2013.01); *F16M 13/022* (2013.01); *B66D 3/046* (2013.01); *B66D 2700/026* (2013.01)

(58) Field of Classification Search
USPC .......... 248/332; 254/390; 212/179–180, 224; 182/36–37, 57–61; 187/239–244, 900; 211/209
See application file for complete search history.

(56) References Cited

U.S. PATENT DOCUMENTS

| | | | |
|---|---|---|---|
| 448,533 A | 3/1891 | Meyer | |
| 1,055,020 A | 3/1913 | Camph | |
| 1,069,295 A | 8/1913 | Sage et al. | |
| 2,902,257 A * | 9/1959 | Young | H02G 1/04 254/134.3 PA |
| 3,463,916 A | 8/1969 | De Bella | |
| 3,805,054 A | 4/1974 | Wolf | |
| 5,393,245 A | 2/1995 | Hinds | |
| 5,711,713 A | 1/1998 | Krueger | |
| 6,401,863 B1 * | 6/2002 | Kirkland | B66D 3/20 182/142 |
| 6,412,736 B1 * | 7/2002 | Zaragoza | A63B 67/10 212/179 |
| 6,916,111 B2 | 7/2005 | Laine | |
| 7,150,449 B1 * | 12/2006 | Dueck | B62H 3/12 254/278 |

(Continued)

FOREIGN PATENT DOCUMENTS

CN 205323086 U * 6/2016

*Primary Examiner* — Alfred J Wujciak

(74) *Attorney, Agent, or Firm* — Clark & Brody LP

(57) ABSTRACT

An apparatus for use in rigging stages includes a portable bar sized to extend across standard widths of a tower or a cross beam with a portion extending beyond the side of the tower or beam. A lifting mechanism, such as a block-and-tackle, is attached to the portion to allow a rigger to raise or lower heavy objects. In a method of use, a rigger carries the lifting bar to a desired location on a tower or beam and secures at least one end of the portable bar to one or more cross bars. Then the rigger can raise or lower heavy objects by attaching a flexible line from the lifting mechanism to the object and manipulating the lifting mechanism to assist in moving the heavy object to a desired location.

1 Claim, 3 Drawing Sheets

(56) References Cited

U.S. PATENT DOCUMENTS

| | | | |
|---|---|---|---|
| 8,534,980 B2 * | 9/2013 | Kuramoto | B60P 1/5409 |
| | | | 212/180 |
| 8,870,145 B1 * | 10/2014 | Carlson | A47G 25/02 |
| | | | 248/317 |
| 9,291,336 B2 | 3/2016 | Murray et al. | |
| 9,345,941 B1 * | 5/2016 | Celedon | A63H 37/00 |

* cited by examiner

METHOD AND APPARATUS FOR STAGE RIGGING

CROSS REFERENCE TO RELATED APPLICATION

This application claims priority from U.S. Provisional Application Ser. No. 62/522,178, which was filed on Jun. 20, 2017, and incorporates the disclosure thereof by reference.

FIELD OF THE INVENTION

The invention relates to the art of portable devices for lifting objects and, in particular, to devices for rigging stages of the type used for theatrical or musical performances and to methods of using such devices.

BACKGROUND OF THE INVENTION

Placement of heavy items at elevated locations is often assisted by one of many known lifting devices. One example of such a process is the placement of items in the construction of a stage that is used for performances of various types, such as theatrical or musical performances, lectures, rallies, and the like. These stages typically have complex set designs that often require last-minute additions or alterations at a time when traditional lifting devices are no longer available.

Features adding complexity to stage construction can be, for example, lighting, video screens, and audio speakers. It is common to use many different lighting elements, such as spot lights or other of lights to illuminate stages, mirror balls, and the like. A basic part of a stage is typically a set of towers, for example two spaced vertical towers connected by a horizontal section. Elements of the stage set mounted to the vertical or horizontal portions of a tower. For example, it is known to mount a stage light on a tower or beam that is fifteen to twenty feet stage to position the stage light above other objects on the stage for proper lighting. Putting such items as lighting on stage towers and beams is often called "rigging."

Many of the stage elements are of significant size and weight. A lighting fixture may weigh in excess of 100 pounds, which presents a significant problem for raising the light and securing it to a tower or beam. One technique for attaching items such as stage lights to a beam or tower involves the use of a bucket lift, which is a large piece of equipment with a movable bucket that is large enough to hold a person and an item such as a light and is attached to the end of a hydraulic arm that can be manipulated by the user to raise or lower the bucket to a desired location. A problem with reliance on the use of a bucket lift is that the equipment is large, expensive, and often not immediately available. For example, in those situations where a stage has been rigged and the bucket lift returned to the leasing company or sent to another location, it is common for a stage designer to order that one of the installed fixtures be replaced or moved or that an additional fixture be installed. A rigger would then be required to accomplish that task without use of a bucket lift. Such would typically require the rigger to climb a stage tower while carrying the heavy lighting fixture or to climb the tower, detach the fixture, and carry it down the tower. That is a dangerous task that requires strength and careful work.

Accordingly, there is a need for improved methods and apparatus for use by stage riggers in the lifting of items including lighting fixtures and other stage articles that the rigger must carry up a tower for installation, bring down a tower, or move from one location to another.

SUMMARY OF THE INVENTION

In accordance with one aspect of the invention a portable lifting apparatus has a lifting bar with connecting elements whereby it can easily be attached to the vertical or horizontal portions of a stage tower in such a manner that one end thereof extends beyond the periphery of the tower to hold a block-and-tackle beyond the periphery of the tower element to allow the rigger to attach a stage fixture on the ground to a flexible line, such as a rope, cable, chain, and the like connected to the block-and-tackle to raise it to a desired location. (Unless otherwise noted, the term "rope' is used herein to refer to any type of flexible line.) Alternatively stage fixture already mounted on the tower is attached to the rope for dismounting the fixture and either lowering it to the ground or moving it to a different horizontal or vertical location. The portable lifting bar can be a simple elongate bar made of lightweight materials that has an attachment device near one end for allowing it to be quickly and easily secured to a cross bar on one side of the tower. The portable lifting bar is long enough to extend across the tower and beyond so whereby it is supported by the cross bar on the opposite side of the tower and provides a cantilevered portion to which the block-and-tackle is attached.

The portable lifting bar can have one or more attachments for securing the lifting bar to a stage tower. In one embodiment, a single attachment device is used near one end of the portable lifting bar for attachment to a horizontally extending cross bar on the tower. The portable lifting bar is supported on the opposite side of the tower by another such cross bar, but no attachment is necessary if the force on the bar is always downward. In another embodiment, the portable lifting bar has multiple attachments for engaging various portions of the tower or a beam, such as cross bars on opposite sides of a tower or horizontal beam to secure the portable lifting bar to the tower or beam and prevent all movement of the bar.

In a preferred embodiment, the block-and-tackle is of the type that has a stop (locking) mechanism that allows a lifting rope to move in only one direction until intentionally released. This allows the user alone to raise or lower an object without having to exert a force on the rope at all times. In a known block-and-tackle, the user releases the stop mechanism by pulling on the tackle's rope and quickly releasing the rope.

In a preferred method of the invention, a rigger carries the apparatus in his hand or by attaching it to an article worn by the rigger, such as a tool belt. The rigger then climbs a tower or ladder adjacent the tower and installs the apparatus of the invention at a desired location on a tower or beam. Because the apparatus is small and light, its installation is easily accomplished. Then the fixture to be moved, installed, or demounted is attached to the block-and-tackle with the rope in a locked condition. The rigger then operates the block-and-tackle to lift or lower the fixture. The rigger can operate the block-and-tackle from the ground or from a position on the tower or beam.

DETAILED DESCRIPTION OF THE INVENTION

Figure 1:
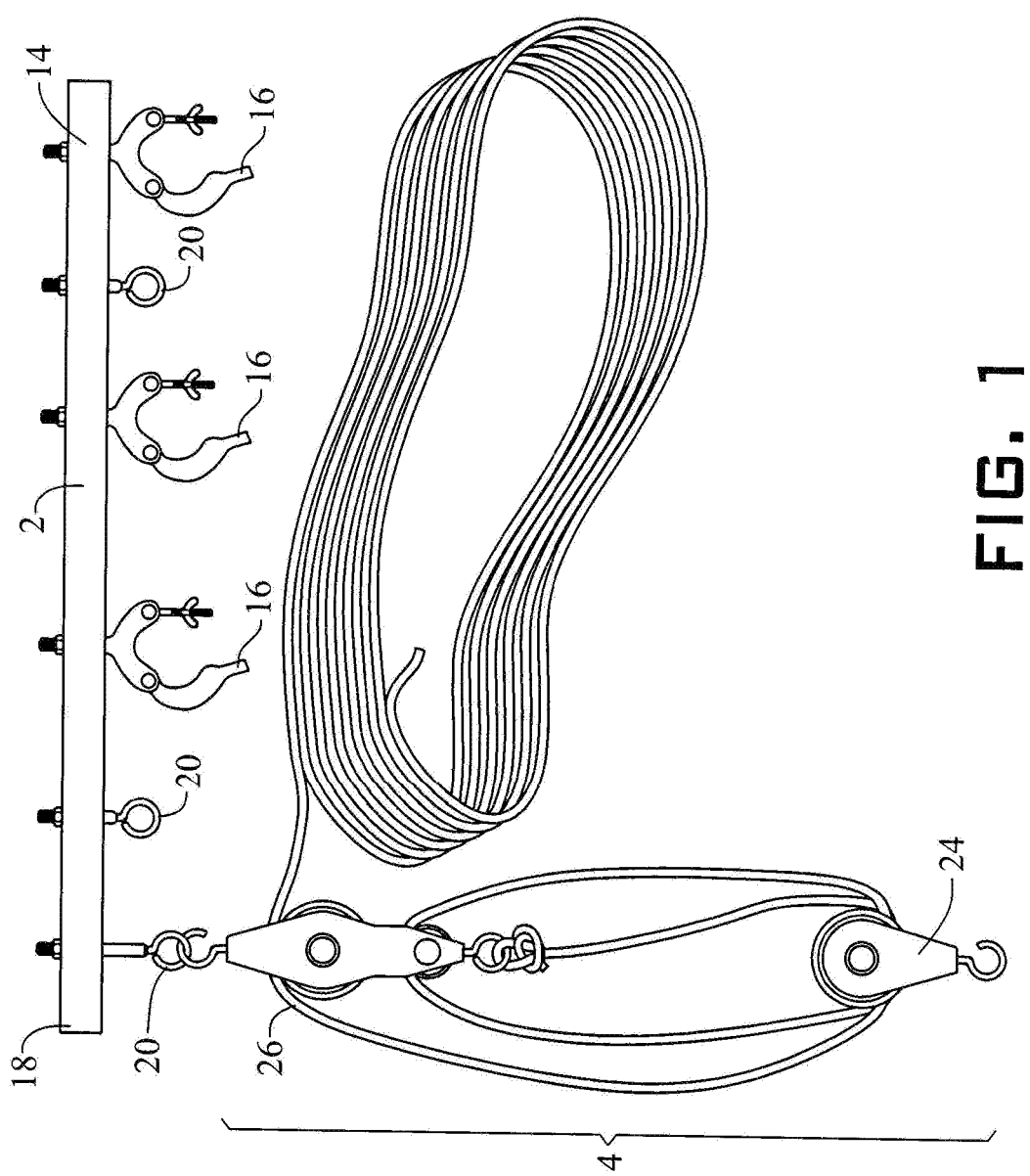
FIG. 1 is a top view of an apparatus in accordance with the invention.
Figure 2:
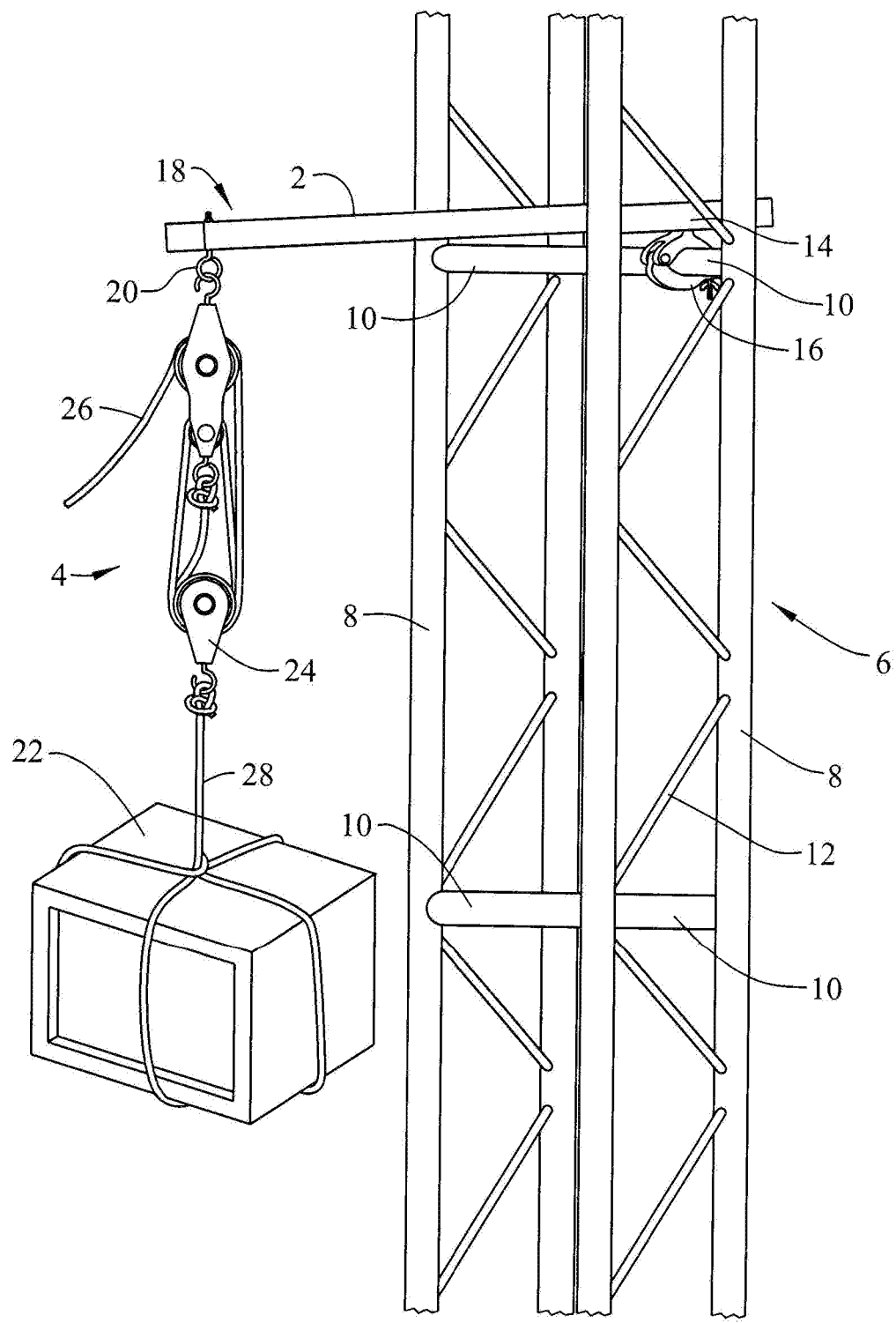
FIG. 2 is a perspective of a stage tower showing the invention in use.

With reference to FIGS. 1 and 2, the invention includes a portable lifting bar 2, which can be an elongate bar as shown that is rectangular in cross section. It can be of many different materials such as aluminum such that it is light but strong enough to support anticipated loads, e.g., 500 pounds. A second part of the invention is a block-and-tackle 4 that can be attached to one end of the portable lifting bar as shown.

FIG. 2 illustrates a portion of a stage with a tower 6 that is known in the art and used for supporting such items as stage lighting and other staging fixtures, such as movable scenery and the like. The tower 6 includes upright elements 8, cross bars 10, and braces 12. An apparatus in accordance with the invention is shown in FIG. 2 attached to the tower in an operational condition. The portable lifting bar 2 extends across two adjacent bars 10 located on opposite sides of the tower, preferably at the same height above the floor that supports the tower 6. One end 14 of the portable lifting bar includes a bracket 16 that can easily and quickly be attached to a bar 10 to secure that end of the portable lifting bar to the tower. The portable lifting bar is long enough to extend from one bar 10 across the tower to a bar 10 on the opposite side of the tower and then beyond the bar on the opposite side whereby the opposite end of the portable lifting bar will position the block-and-tackle far enough from the side of the tower to allow a lighting fixture or other object to be mounted to the tower or beam or other staging structure by a rigger. For example lighting towers (trusses) are often either twelve or twenty inches in width, and the length of the portable lifting bar can accommodate those widths.

For example, the portable lifting bar illustrated in FIG. 1 provides three brackets 16, wherein a first of the brackets is positioned at one end of the portable lifting bar, a second bracket is positioned to accommodate a twelve-inch-wide tower, and a third bracket is positioned to accommodate a twenty-inch-wide tower. Thus, the bracket at the first end can be attached to a cross bar 10 and one of the other two brackets attached to the cross bar on the opposite side of either a twelve-inch tower or a twenty inch tower, depending on the circumstance.

FIG. 2 illustrates an arrangement for lifting a fixture 22. A block-and-tackle 4 is attached to an end 18 of the portable lifting bar at a connector, such as eye bolt 20. The fixture is attached to a movable pulley 24 of the block-and-tackle 4 by a rope 28. The rigger can easily raise the fixture to the desired height by pulling on the rope 26.

The block-and-tackle preferably is of the type that includes a locking element (not shown) that holds the load until raised further by pulling again on the rope 26 or lowering the load by operating the rope 26 to release the locking element.

The bar can be of various constructions, depending on the expected loads to be lifted. The bar can be made of wood and of various cross-sectional shapes. A rectangular cross-section is preferred for ease of use an attachment to the elements of a tower. As noted above, the bar can also be made of aluminum with a hollow core to render it lighter. Other metals could be used as well. Also, the hollow core can be filled with a wooden element configured to fit tightly in the interior of the aluminum bar to add additional strength. Various types of wood can be used, such as oak. Additional strengthening components can be added depending on the loads to be lifted and keeping in mind the objective that it be lightweight to facilitate transport and maneuvering by the rigger.

Figure 3:
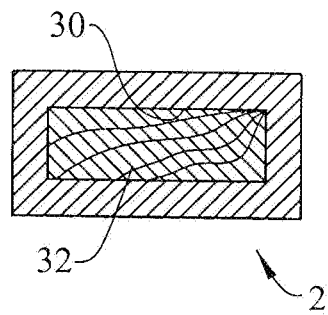
FIG. 3 is a cross section of an embodiment of a lifting bar in accordance with the invention.
Figure 4:
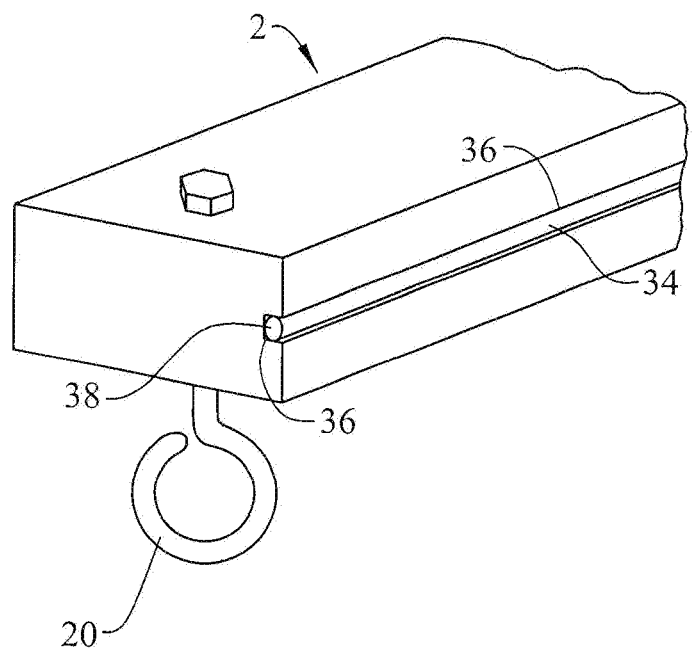
FIG. 4 is a perspective of another embodiment of a lifting bar in accordance with the invention.

FIG. 3 is a cross section of a lifting bar 2 and illustrates the embodiment of the invention where the portable lifting bar 2 comprises a metal bar, e. g., of aluminum, that has a longitudinal hollow core formed by an inner surface 30. The hollow core is filled with a second bar 32, preferably made of wood, and extending the length of the aluminum component, to add rigidity to the aluminum. FIG. 4 is a perspective of a lifting bar with additional rods 34 on opposite sides of the bar 2 and fitted in grooves 36. The rods may be secured to the bar in any of various ways. They can, for example, be welded or brazed to the bar or they can be threaded at one or both ends and secured by a nut 38 at one or both ends to clamp the rods to the bar. The bars should have high tensile strength and may be made of metals, such as steel, or other appropriate materials including composites.

In operation, a rigger can easily carry the portable lifting bar and the block-and-tackle to a location on a tower or beam near the location of a fixture that is to be detached or the location where a fixture is to be installed. For example, it is common for a rigger to carry a tool bag, and the portable lifting bar and block-and-tackle can easily be placed in the tool bag or attached to it. The rigger then places the portable lifting bar across two of the cross bars 10 and secures at least the one end opposite the block-and-tackle to a cross bar on the side of the tower opposite the load to be raised. Then the rigger operates the rope 26 to raise a load that is already attached to the block-and-tackle or attaches the block-and-tackle to the load to be lifted and then operates the rope 26 to raise the load.

Modifications will be apparent to those of skill in the art. For example, the lifting bar may be made of composite materials, such a carbon fiber composites, metal alloys, etc. As well, a winch may be substituted for the block-and-tackle. Because weight is of paramount concern, the winch would be manually operated from both the stage or from an elevated position. Other modifications will be apparent to those of skill in the art.

I claim:

1. A method for rigging a stage of the type used for theatrical or musical performances wherein said stage comprises one or more towers or beams, comprising the steps of attaching an apparatus for use by a rigger to raise or lower articles used on said stage comprising a portable lifting bar having a bottom surface, a first bracket at one end of said portable lifting bar, said first bracket being configured to attach said one end to a first cross bar of a stage tower or beam and to allow said portable lifting bar to extend across said tower or beam such that when in use said portable lifting bar is supported by a second cross bar of said tower or beam, said second cross bar being substantially parallel to and substantially coplanar with said first cross bar, and an opposite end of said portable lifting bar extends beyond said second cross bar, a second bracket spaced from said first bracket and configured to attach said portable lifting bar to said second cross bar, and a self-locking pulley mounted to said portable lifting bar at the end of the portable lifting bar opposite said first bracket to said first cross bar and to said second cross bar of the stage tower or beam, attaching the block-and-tackle of said apparatus to the articles to be carried, and operating said block-and-tackle to raise or lower said articles.

* * * * *